United States Patent [19]

McCrary

[11] Patent Number: 4,947,930
[45] Date of Patent: Aug. 14, 1990

[54] HEAT BONNET FOR HEAT PUMP

[76] Inventor: Charles H. McCrary, Rte. 2, Box 225, Gaston, S.C. 29053

[21] Appl. No.: 405,865

[22] Filed: Sep. 11, 1989

[51] Int. Cl.⁵ .......................................... F25B 29/00
[52] U.S. Cl. ........................................ 165/47; 165/29; 165/64; 62/80; 62/238.6; 62/238.7; 237/2 B
[58] Field of Search ................... 62/80, 238.6, 238.7; 165/29, 47, 64; 237/2 B

[56] References Cited

U.S. PATENT DOCUMENTS

| 2,229,569 | 1/1941 | Hoesel | 62/1 |
| 2,234,474 | 3/1941 | Higham et al. | 62/1 |
| 3,127,930 | 4/1964 | Tenniswood | 165/29 |
| 3,159,981 | 12/1964 | Huskey | 62/156 |
| 4,024,722 | 5/1977 | McCarty | 62/81 |
| 4,143,815 | 3/1979 | Meysenburg | 62/238.6 |
| 4,204,409 | 5/1980 | Satama | 62/271 |
| 4,402,193 | 9/1983 | McFee | 62/304 |
| 4,415,023 | 11/1983 | Vandervaart | 165/29 |
| 4,484,567 | 11/1984 | Sikora | 126/431 |
| 4,505,328 | 3/1985 | Schmitt | 237/2 B |
| 4,612,778 | 9/1986 | Medrano | 62/311 |
| 4,732,012 | 3/1988 | Thorpe | 62/304 |
| 4,761,964 | 8/1988 | Pacheco | 62/160 |

Primary Examiner—John Ford
Attorney, Agent, or Firm—Benoni O. Reynolds

[57] ABSTRACT

A detachable heat bonnet for mounting over and around a conventional heat pump which confines and electrically heats air confined in spaced areas between the enclosure means and the exterior surfaces of the heat pump. This supplementary heat supplied by a small, high capacity electrical heater, prevents the actuating of the auxiliary heat strips of the heat pump, when the coolness of the inside air calls for the heating cycle.

4 Claims, 2 Drawing Sheets

HEAT BONNET FOR HEAT PUMP

BACKGROUND OF THE INVENTION (1.) Field of the Invention

This invention relates to apparatus for improving or supplementing heat sources available to a heat pump.

(2) Description of the Prior Art

Heat pumps represent a novel approach to heating and air conditioning a home with substantially the same apparatus. Heat pump units have an inside air coil and an outside air coil. The inside air coil directly heats or cools the inside air from the home and the outside air coil dissipates the heat transferred from the inside of the home or recovers heat from the outside air for use in heating the inside air. Refrigerant in the coils, which are interconnected, flows from the inside air coil to the outside air coil during the air conditioning cycle and flows from the outside air coil to the inside air coil during the heating cycle. Auxiliary electrical heat strips are actuated when the capacity of the heat pump is not able to handle the heating demands of a particular room or area of the home. Thus, a heat pump is a type of heat exchanger used in heating or cooling a home. The heating or cooling cycle is actuated by a thermostat in the home. Outside controls actuate defrost cycles which occur about every 90 minutes in the air conditioning cycle for a three minute period to remove ice or frost which may accumulate on the outside air coil.

Heat pumps are primarily used in warmer geographical areas because there is little heat to recover from the air at lower outside temperatures. One end of the heat pump exhausts into ducts traversing the rooms of the home. The other end of the heat pump has a grill for the input of outside air. Blower and fan motors circulate the air past the air coils and a compressor circulates the refrigerant passing back and forth through the air coils.

A number of different apparatus have been developed over the years for enhancing the performance of heat pumps. Some have related solely to defrosting cooling units by radiant heat from light bulbs or by controlling the defrosting cycles. Others have been addressed to retarding or accelerating cooling by the supplementary heating or cooling of the capillary tubing carrying the refrigerant. Still others have introduced supplementary apparatus for precooling or preheating air passing by the inside air coil. At least one suggested an energy saving cover for evaporative coolers.

The present invention takes a simpler approach than the prior art by reducing the overall power consumption of heat pump systems by the use of a simple electric heater to forestall the actuating of the auxiliary heat strips. The heat means of the present invention supplies heat for absorption by the outside air coil at a lower cost than actuation of the heat strips. The Heat Bonnet is also unique in that this improvement requires no modification of the basic heat pump unit.

Prior art known to this inventor includes the following U.S. Pat. Nos.:

| | | |
|---|---|---|
| 2,229,569 | 1/1941 | Hoesel |
| 2,234,474 | 3/1941 | Higham et al. |
| 3,127,930 | 4/1964 | Tenniswood |
| 3,159,981 | 12/1964 | Huskey |
| 4,024,722 | 7/1977 | McCarty |
| 4,204,409 | 5/1980 | Satema |
| 4,402,193 | 9/1983 | McFee |
| 4,415,023 | 11/1983 | Vandervaart |
| 4,484,567 | 11/1984 | Sikora |
| 4,612,778 | 9/1986 | Medrano |
| 4,732,012 | 3/1988 | Thorpe |
| 4,761,964 | 8/1988 | Pacheco |

SUMMARY OF THE INVENTION

The present invention is a heat bonnet for improving the heating efficiency of a conventional heat pump. Because of the few, simple components, the heat bonnet is easily and inexpensively manufactured, reliable in operation and easily maintained. Because of its configuration, it requires no alteration to the basic heat pump, is easily installed and is readily removed for access to the heat pump for maintenance.

According to the preferred embodiment of the present invention, the heat bonnet, for providing a supplementary source of heat for a conventional heat pump having exterior surfaces, an inside air coil and an outside air coil, comprises:

an enclosure means for confining air between the enclosure means and the heat pump, and a heating means, mounted inside the enclosure means, for heating the confined air, supplementing the heat otherwise available to the outside air coil of the heat pump during heating cycles.

The enclosure means of the present invention is an oven-like shell detachably mounted over and around the heat pump creating spaced areas between the shell and the exterior surfaces of the heat pump casing. The enclosure means has a roof member with two arcuate panels, two side members, and a front member and a rear member, each having a rectangular opening to accommodate the heat pump and serving to further enclose the spaced areas.

The heating means of the present invention is a small electric heater having a capacity of 100 to 1500 watts connected to a power source and detachably held within the enclosure means by an open stirrup. The heat emanating from the electrical heater settles into the spaced areas above and on either side of the exterior surfaces of the enclosed heat pump and is retrieved during the heating cycle by the outside air coil for transmission to the inside air coil for heating the inside air of the home being heated.

The supplementary heat supplied by the heating means prevents the actuating of the auxiliary heat strips found in most heat pumps when the coolness of the inside air calls for the heating cycle.

OBJECTIVES OF THE INVENTION

The objectives of the present invention are to provide a heat enhancing apparatus for use with a conventional heat pump which is:

(1) economical to use;

(2) simple and inexpensive to manufacture;

(3) compact in size and unitary in design to permit less costly installation and maintenance;

(4) fully automatic in operation, requiring no additional controls and does not alter the basic heat pump unit.

Other objectives and advantages of the present invention will be apparent during the course of the following detailed description.

DETAILED DESCRIPTION OF THE PREFERRED EMBODIMENT OF THE INVENTION

The Heat Bonnet is a cover or shell containing a heat source which is easily and quickly installed atop a conventional heat pump, conforming to the general contour of the heat pump it encloses. For rectangular shaped heat pumps, which exhaust horizontally, the Heat Bonnet would be a box-like cover forming a rounded or tapered roof with members and baffles enclosing the top and sides of the heat pump.

Throughout the following detailed description of the present invention, like reference numbers are used to denote like parts disclosed in the accompanying drawings, FIGS. 1-4.

Figure 1:
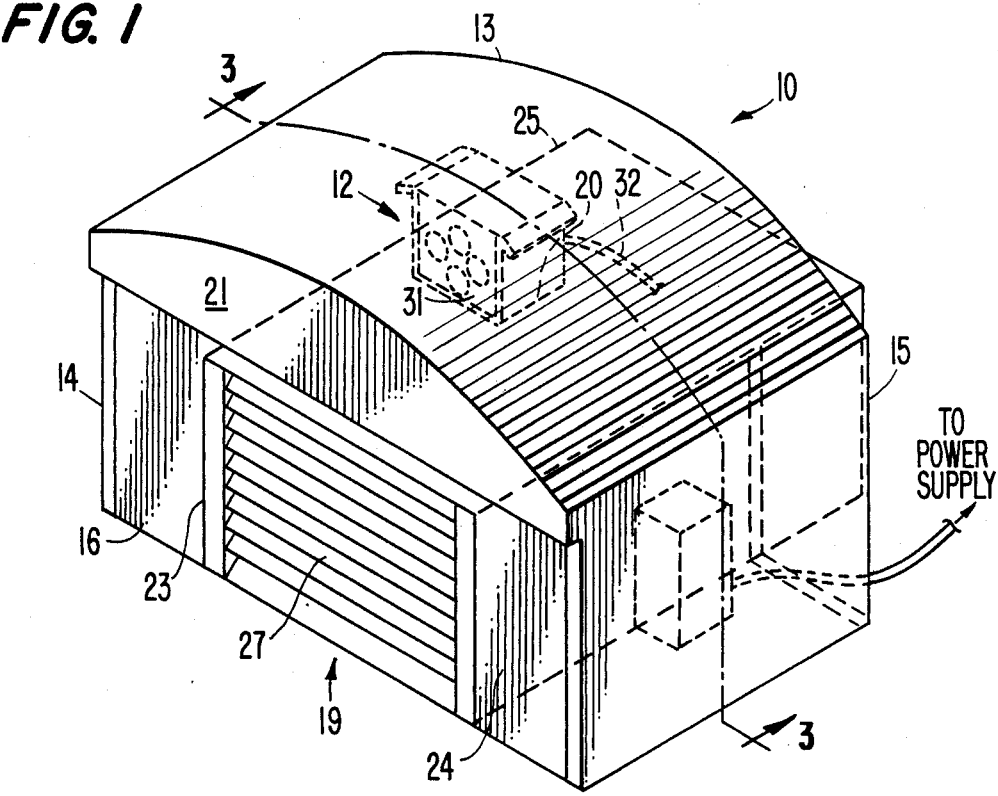
FIG. 1 is a perspective view of a heat pump from the right front enclosed by a heat bonnet constructed in accordance with the principles of the present invention.
Figure 2:
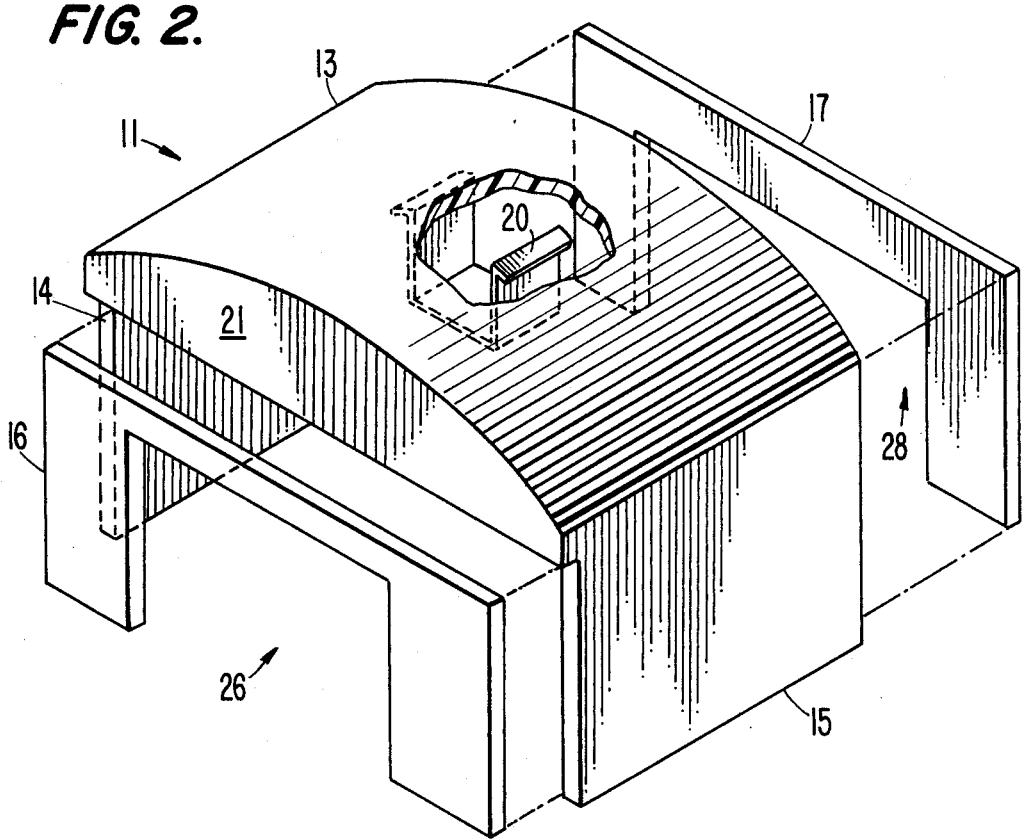
FIG. 2 is an exploded perspective view of the enclosure means of the present invention showing the respective members of the shell and the open stirrup for mounting the heating means.
Figure 3:
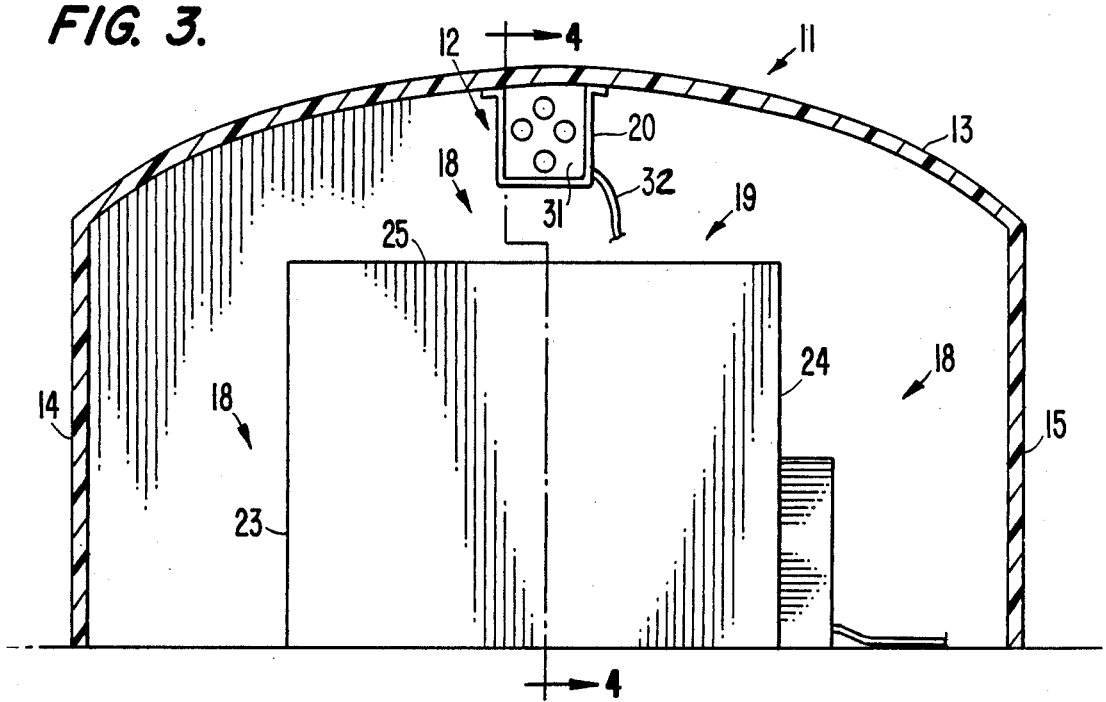
FIG. 3 is a transverse cross sectional view of the present invention taken along line 3—3 of FIG. 1, looking in the direction of the arrows, showing the spaced areas created between the inside surfaces of the enclosure means and the outside surfaces of the enclosed heat pump.
Figure 4:
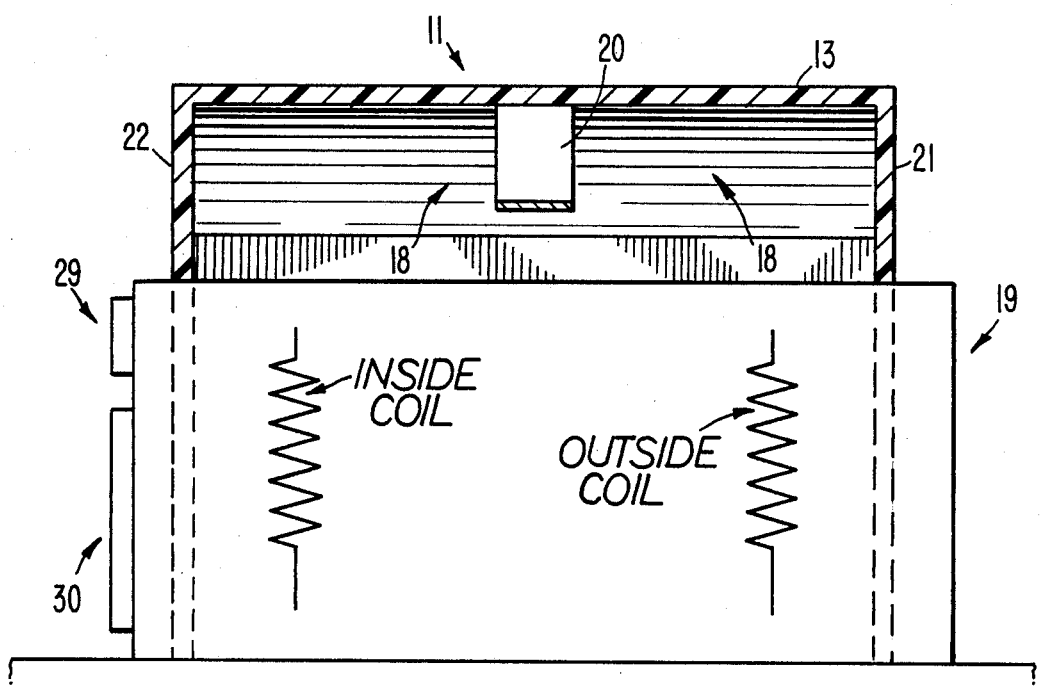
FIG. 4 is a longitudinal sectional view of the present invention taken along line 4—4 of FIG. 3, showing the spaced area created between the roof member and the top surface of the enclosed heat pump.

As best shown in FIGS. 1 and 2, the preferred embodiment of the Heat Bonnet of the present invention, shown generally at reference numeral 10 for a horizontally disposed heat pump, has an enclosure means, shown generally at reference numeral 11 and a heating means, shown generally at reference numeral 12. Enclosure means 11 is an oven-like shell, detachably mounted over and around a conventional heat pump, creating cavities or spaced areas between the shell and the outside surfaces of the heat pump. Enclosure means 11 has a roof member 13, side members 14 and 15, a front member 16 and a rear member 17. As shown in FIG. 3, enclosure means 11 confines air held therein to spaced areas, shown generally at reference numeral 18, immediately adjacent to the exterior surfaces of the heat pump, shown generally at reference numeral 19.

Heating means 12 is attached to the underside of enclosure means 11 by an open stirrup 20. Heating means 12 supplements the heat otherwise available to the outside air coil (not shown) of heat pump 19 during heating cycles.

Heat Bonnet 10 can be prefabricated off-site, or can be constructed at the site of heat pump 19 for heat pumps units previously installed without the heat bonnet. Enclosure means 11 may be made of any light weight material such as plywood, styrofoam, fiber glass or metal. Fiber glass or styrofoam would be preferable because of their high strength to weight ratio. The materials may be insulated or non-insulated depending on the prevailing temperatures in the region where Heat Bonnet 10 is being used.

Roof member 13 of enclosure means 11 is curved downwardly to provide for rain runoff and to provide vertical depth underneath roof member 13 for open stirrup 20 mounted thereon to house heating means 12. Roof member 13 has arcuate panels 21 and 22 to provide a tight fit between enclosure means 11 and heat pump 19, which enclosure means 11 encloses. Side members 14 and 15, attached at right angles to the side edges of roof member 13, serve as supports and create spaced areas 18 between sides 23 and 24 of heat pump 19 and side members 14 and 15, respectively, of enclosure means 11. The arcuate panels 21 and 22 complete the formation of the spaced area 18 between the underside surface of roof member 13 and the top surface 25 of heat pump 19.

Front member 16 has a rectangular opening, shown generally at reference numeral 26, to accommodate grilled end 27 of heat pump 19. Front member 16 also serves as a baffle to further enclose the spaced area 18 formed respectively between the interior surfaces of side members 14 and 15 of enclosure means 11 and the exterior surfaces of sides 23 and 24 of heat pump 19. Rear member 17 similarly has a rectangular opening, shown generally at reference numeral 28, to accommodate the supply air output, shown generally at reference numeral 29 and the return air input, shown generally at reference numeral 30, of heat pump 19. Rear member 17 also serves as a baffle to further enclose the spaced areas 18 formed respectively between the interior surfaces of side members 14 and 15 of enclosure means 11 and the exterior surfaces of sides 23 and 24 of heat pump 19. Appropriate duct work is installed within the house (not shown) to be heated or cooled and is routed to heat pump 19 where the ducts are connected at supply air output 29 and return air input 30, to circulate inside air from the house to and from heat pump 19.

Heating means 12 is a small electric heater 31 with a high capacity (100 to 1500 watts) connected by cable 32 to an a.c. power source (not shown). Preferably, heater 31 would be a small ceramic type heater which produces large amounts of heat from a cube shaped unit which slips inside open stirrup 20 and is held therein by retainer brackets or bolts (not shown). Model 1500 W, the Pelonis safe-t-furnace TM, fits these requirements and produces up to 5200 BTU's of heat at relatively low cost.

Conventional heat pumps, such as heat pump 19, have two interconnecting coils which contain refrigerant pumped by a compressor between the two coils. The flow of the refrigerant between the coils can be reversed by a reverse valve in the heat pump. An outside air coil (not shown) is mounted behind outside grill end 27 and either absorbs heat from the outside air or dissipates heat to the outside air, depending on whether the heat pump is in a heating or cooling mode. An inside air coil (not shown) is mounted just inside supply air output 29 and either cools the inside air before a blower motor (not shown) pulls the cool air into the house or heats the inside air before the blower motor pulls the heated air into the house, depending on whether heat pump 19 is in the cooling or heating mode.

Space is allocated just inside supply air output 29 for the attachment of auxiliary electrical heaters or heat strips (not shown). The series of auxiliary heaters, usually 5.3 KW, are installed in a location directly in front of the air discharge opening in the unit supply air plenum. These auxiliary electrical heaters are controlled automatically from the room thermostat as well as through outdoor thermostats. The purpose of the latter thermostats is to allow the auxiliary heaters to come on only when a balance point is reached and the heat loss of the space in the room is greater than the capacity of the heat pump. This keeps the operation of the auxiliary heaters at a minimum. The room thermostat is the master controller for the heat pump and the auxiliary heaters.

During the cooling cycle, heat pump 19, through its inside air coil, absorbs heat from the air inside the house and transfers that heat to the outside via the outside air coil. During the heating cycle, the unit, though its outside air coil, transfers the heat into the inside air coil and thence into the house. Thus, the same heat pump heats and cools.

All inside air in the house is circulated through the inside air coil by a blower motor located just inside the return air input 30. The inside air coil absorbs heat from the air when cooling or releases heat into the air when heating. Outside air flows by the outside air coil with the help of a fan located just inside grilled end 27. The outside air does not enter the house. The outside air coil 20 releases heat absorbed by the inside air coil into the outdoor air when cooling, or the outside air coil absorbs heat from the outside air when heating.

During the cooling cycle, heat pump 19, removes heat and moisture from the air inside the house. The inside air coil is cooled by the evaporation of liquid refrigerant, therefore the inside air passing over it is cooled and dehumidified. As the air is cooled, it gives up some of its heat to the coil fins and tubing. The refrigerant, in turn, absorbs the coil heat which is then pumped to the outside coil.

The refrigerant, carrying the heat removed from the air inside the house, condenses in the outside air coil and thereby gives up its heat to the outside air being circulated across it. The cooling cycle continues until the house is cooled to satisfy the setting of the room thermostat at which point heat pump 19 automatically turns off.

The same room thermostat automatically institutes the heating cycle by actuating the reversing valve which, in turn, reverses the flow of refrigerant. With this reverse flow, the outside air coil will remove heat from the outside air. The compressor will transfer the heat ladened refrigerant to the inside air coil. The inside air coil releases the heat to the inside air which is circulated through the duct work to each room of the house.

Auxiliary electrical heaters are installed in the heat pump, especially in colder regions, to balance the heating requirements of the house in relation to the capacity of the heat pump. These additional heat producers are turned on and off automatically by the room and outside thermostat according to the outdoor temperature plus the room thermostat setting.

The auxiliary heaters or heat strips activate when there is little or no heat left in the outside air. However, the heat strips are very inefficient and very expensive to operate. The present invention, Heat Bonnet 10, provides an oven or warming chamber surrounding heat pump 19, which when placed into operation, will cause the outside air coil to exchange heat from the warming chamber to the inside of the house, via the outside air coil. The spaced areas 18 of Heat Bonnet 10 are heated by the small electrical heater 31, ranging from 100 watts to 1500 watts, depending on the intensity of the cold outside air. The heated air in the spaced areas 18 in effect deceives heat pump 19 and prevents the heat strips from actuating. This supplementary heating operation provides a warmer house relative to the total heating cost expended. The small electrical heater 31 consumes less electrical energy than the heat strips.

Spaced areas 18 on a prototype model displaced approximately 54 cubic feet. Overall dimensions of the enclosure means 11, were 75 inches wide, 56 inches deep and 32 inches high. Arcuate panels 21 and 22 were approximately 12 inches high at their highest point, which provided ample clearance for the Pelonis safe-t-furnace to hang beneath the center of roof member 13. The test model was made of plywood and was fully insulated.

I claim:
1. A heat bonnet, for providing a supplementary source of heat for a conventional heat pump having an exterior casing exposed to outside air and an inside air coil and an outside air coil mounted within said exterior casing, which comprises:
   an enclosure means for confining air between said enclosure means and said heat pump exterior casing while allowing outside air to flow to said outside air coil and inside air to flow to said inside air coil, and
   a heating means, mounted inside said enclosure means, for heating said confined air and thereby warming said heat pump exterior casing, supplementing the heat otherwise available to said outside air coil of said heat pump during heating cycles.

2. The heat bonnet of claim 1 wherein enclosure means is an oven-like shell detachably mounted over and around said heat pump creating spaced areas between said shell and the exterior surfaces of said heat pump exterior casing.

3. The heat bonnet of claim 1 wherein heating means is a small electric heater having a capacity of 100 to 1500 watts connected to a power source and detachably held within said enclosure means by an open stirrup.

4. The heat bonnet of claim 2 wherein said enclosure means has a roof member with two arcuate panels, two side members, and a front member and a rear member, each having a rectangular opening to accommodate said heat pump and serving to further enclose said spaced areas.

* * * * *